US010890287B2

(12) United States Patent
Alberts

(10) Patent No.: US 10,890,287 B2
(45) Date of Patent: Jan. 12, 2021

(54) SYSTEM OF FLEXIBLE PIPES AND COUPLING ELEMENTS AND METHOD OF PRODUCING SUCH A FLEXIBLE PIPE

(71) Applicant: Halpa Intellectual Properties B.V., Gramsbergen (NL)

(72) Inventor: Bert Fennechienes Alberts, Twist (DE)

(73) Assignee: Karizan B.V., Gramsbergen (NL)

( * ) Notice: Subject to any disclaimer, the term of this patent is extended or adjusted under 35 U.S.C. 154(b) by 845 days.

(21) Appl. No.: 15/320,271

(22) PCT Filed: Jun. 19, 2015

(86) PCT No.: PCT/NL2015/050448
§ 371 (c)(1),
(2) Date: Dec. 19, 2016

(87) PCT Pub. No.: WO2015/194955
PCT Pub. Date: Dec. 23, 2015

(65) Prior Publication Data
US 2017/0184243 A1 Jun. 29, 2017

(30) Foreign Application Priority Data

Jun. 20, 2014 (NL) ..................................... 2013043

(51) Int. Cl.
*F16L 39/02* (2006.01)
*F16L 11/22* (2006.01)

(52) U.S. Cl.
CPC ............... *F16L 39/02* (2013.01); *F16L 11/22* (2013.01)

(58) Field of Classification Search
CPC ......... F16L 39/02; F16L 11/22; F16L 39/005; F16L 39/00; F16L 11/20; F16L 11/24; F16L 25/12

(Continued)

(56) References Cited

U.S. PATENT DOCUMENTS 1,736,923 A * 11/1929 William .................. F16L 39/02
285/148.13
2,650,112 A * 8/1953 Kinkead .................. E04F 17/00
285/47

(Continued)

FOREIGN PATENT DOCUMENTS

EP 1731823 A1 12/2006

OTHER PUBLICATIONS

International Search Report for application PCT/NL2015/050448, dated Oct. 9, 2015.

(Continued)

*Primary Examiner* — David Bochna
*Assistant Examiner* — James A Linford
(74) *Attorney, Agent, or Firm* — Oppedahl Patent Law Firm LLC

(57) ABSTRACT

The invention relates to a system of flexible pipes (1) and coupling elements (6) for coupling the flexible pipes. The flexible pipes each comprise an inner conduit and multiple cavities running substantially parallel over the outer surface of the inner conduit. The coupling elements each comprise an inner opening and multiple outer openings surrounding the inner opening, such that, in the coupled state, the inner conduits of adjacent flexible pipes are connected by means of the inner opening of the intermediate coupling element and the cavities of adjacent flexible pipes are connected by means of the outer openings of the intermediate coupling element.

Figure 1:
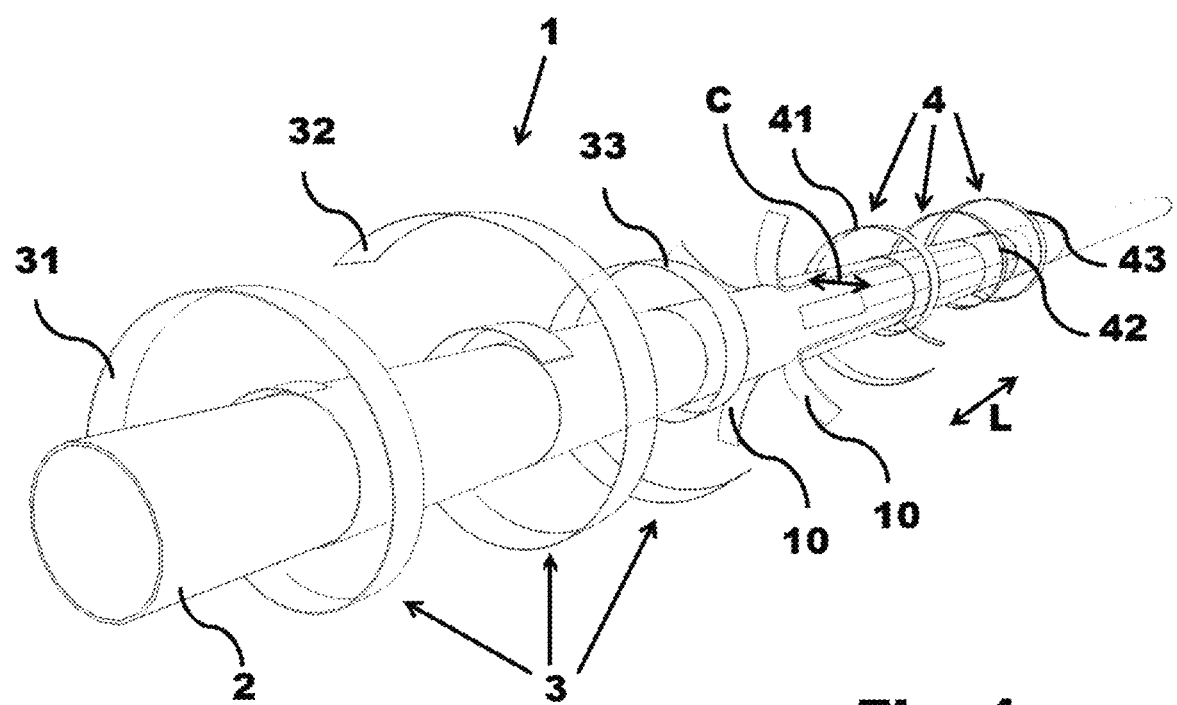

The invention further relates to a method of producing a flexible pipe as described as part of the system.

6 Claims, 11 Drawing Sheets

(58) Field of Classification Search
USPC .................. 285/123.3, 123.4, 123.12, 123.14
See application file for complete search history.

(56) References Cited

U.S. PATENT DOCUMENTS

| | | |
|---|---|---|
| 4,341,392 A | 7/1982 | van Dongeren |
| 5,423,353 A | 6/1995 | Sorenson |
| 5,713,607 A | 2/1998 | Webb |
| 2008/0006337 A1 | 1/2008 | Quigley et al. |
| 2009/0145506 A1* | 6/2009 | Queau ................... F16L 39/005 138/112 |
| 2011/0041934 A1* | 2/2011 | Holler ................... F16L 39/005 137/561 R |

OTHER PUBLICATIONS

Netherlands Search Report for application NL 2013043, dated Nov. 27, 2014.

\* cited by examiner

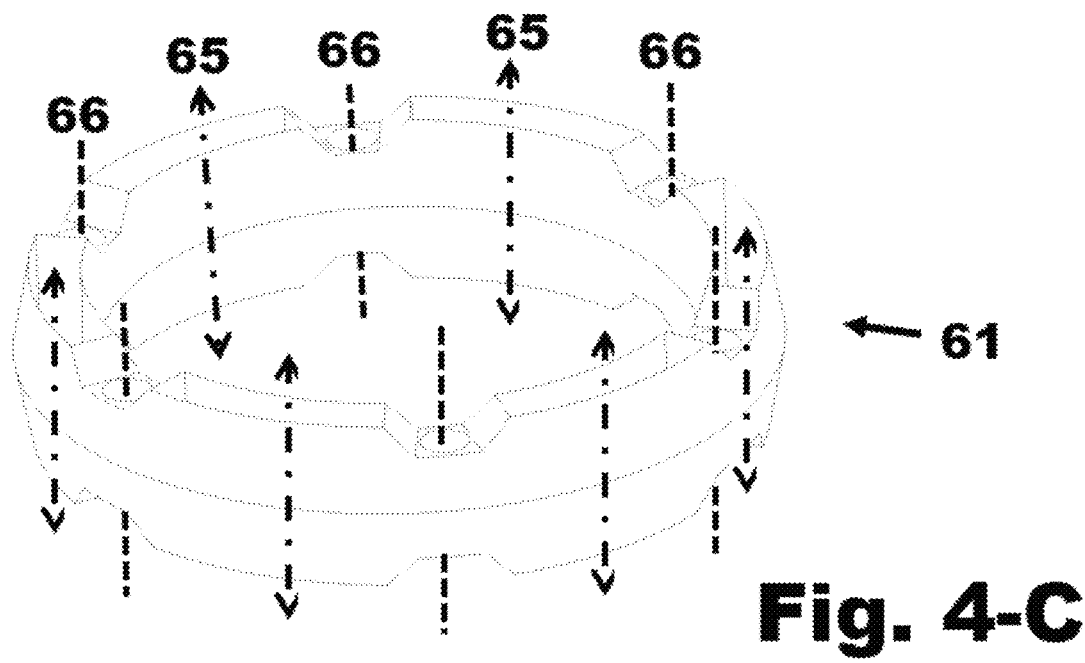
Fig. 4-C
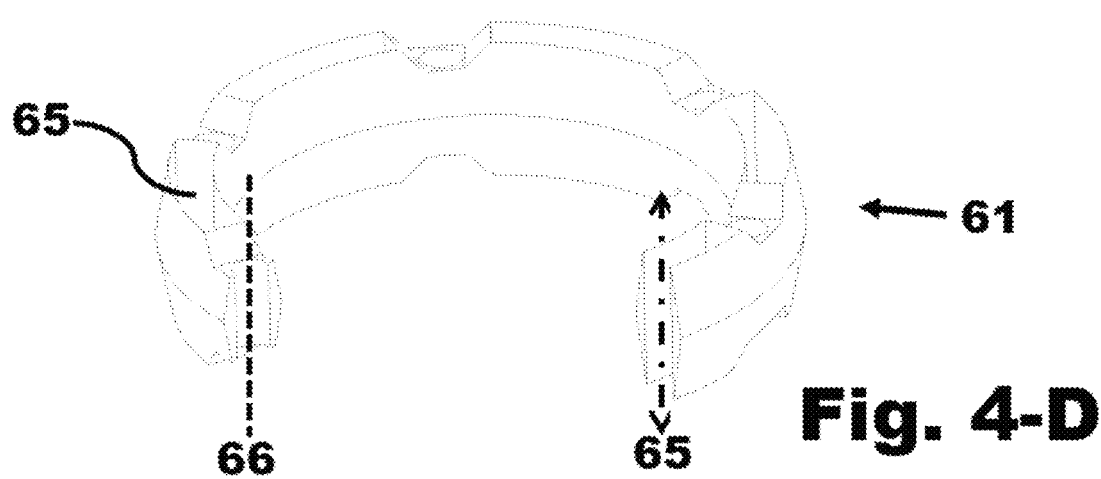
Fig. 4-D

SYSTEM OF FLEXIBLE PIPES AND COUPLING ELEMENTS AND METHOD OF PRODUCING SUCH A FLEXIBLE PIPE

The invention relates to a system of flexible pipes and coupling elements for coupling the flexible pipes. The invention further relates to a method of producing a flexible pipe, preferably a pipe for use in the production of hydrocarbons.

By flexible pipe a pipe is meant that is sufficiently flexible to be rolled up for transportation. Flexibility also provides advantages during installation and operation. Moreover a flexible pipe can be easily retrieved in order to be re-used.

Flexible pipes for transporting fluid are known to be made from a combination of metal and thermoplastic sheaths and covers made using an extrusion process as described in WO2012/092931. This known pipe is suitable for use in the subsea transportation of fluids.

The present invention has for its object to provide a system according to the preamble of universal, flexible pipes that are suitable for many purposes.

According to the present invention this object is achieved by a system according to the preamble, wherein the flexible pipes each comprise an inner conduit and multiple cavities running substantially parallel over the outer surface of the inner conduit and wherein the coupling elements each comprise an inner opening and multiple outer openings surrounding the inner opening, such that, in the coupled state, the inner conduits of adjacent flexible pipes are connected by means of the inner opening of the intermediate coupling element and the cavities of adjacent flexible pipes are connected by means of the outer openings of the intermediate coupling element.

Such a system is known in the field, for instance from US2008/0006337 and U.S. Pat. No. 5,713,607.

The system according to the invention distinguishes over the prior art in that each coupling element comprises a male part and a female part for receiving the male part and a joint element for placement between two flexible pipes, wherein the joint element comprises the inner opening and the outer openings, wherein the dimensions of the inner opening correspond to the dimensions of the inner conduit and the dimensions of the outer openings correspond to the dimensions of the cavities for forming straight passageways between adjacent flexible pipes and further comprises through holes for longitudinal fasteners, wherein the flexible pipes at the outer ends are arranged for receiving the fasteners. The coupling element provides for a fluid tight seal. Furthermore the coupling element can be coupled and decoupled manually without the need for additional tools. In addition the mating dimensions of the joint element and the flexible pipes result in straight passageways having a non-tapering cross section. In the coupled state an unobstructed flow or flush flow is made possible between coupled flexible pipes.

According to an elegant preferred embodiment in the coupled state of the coupling element the joint element (including the fasteners) is enclosed in the coupling element.

According to a practical preferred embodiment the female part has inner thread and the male part has outer thread.

A further object of the present invention is to provide a method of producing such a flexible pipe having multiple fluid passageways.

According to the present invention this further object is achieved by a method of producing a flexible pipe, comprising the following steps:

a) Selecting a tube for forming an inner conduit;
b) Placing a number of spacer elements at a mutual distance on to the inner conduit, said spacer elements having a general longitudinal shape; and
c) Fixating the spacer elements to the inner conduit.

Such a method is known from US2008/0006337.

The method according to the invention distinguishes over the prior art by the following steps:

d) Applying one or more layers comprising thermoplastic material to the spacer elements to form an outer cover, such that cavities are enclosed between the inner conduit, the spacer elements and the outer cover; and
e) Fixating at least one of the layers to the spacer elements, such that the cavities are suitable for use as passageways for objects.

The flexible pipe produced by the method according to the invention can withstand high working pressures (of about 15000 psi) due to the pressure retaining spacers.

The invention provides a universal system of interconnectable flexible pipes that is suitable for many purposes. The system according to the invention is specifically for transporting flowing material, such as a fluid or particles, preferably for use in the production of hydrocarbons.

The cavities surrounding the inner conduit allow the pipe to be adapted for cooperation with all types of equipment. Objects, such as cables, can be received in the cavities, for instance data cables, power cables, optic fibre cables, for connecting equipment. One example is the equipment described in the international patent application WO2014/011043 of the same applicant. Herein a so called Wire line Retrievable Oil Production (WROP) system is described for the production of hydrocarbons. Specifically the pipe according to the present invention can be used as a tubing to receive plug-in devices as described in WO2014/011043.

According to a further preferred embodiment each flexible pipe comprises:
An inner conduit;
A number of spacer elements having a general longitudinal shape fixated at a mutual distance to the outer side of the inner conduit;
An outer cover formed by one or more layers of thermoplastic material fixated around the inner conduit and the spacer elements, such that longitudinal cavities suitable for use as passageways for objects are formed between the inner conduit, the spacer elements and the outer cover.

In this preferred embodiment of the system the flexible pipes can be produced in a fast and reliable manner and can be adapted optimally for their intended use. Depending on the specific use of the pipe the spacer elements can be laid in different patterns, including extending substantially in longitudinal or helical direction over the inner conduit.

The inner conduit can be reinforced in a preferred embodiment, wherein the inner conduit comprises an inner cover formed by one or more layers of thermoplastic material fixated around the inner conduit.

According to a multipurpose embodiment of the pipe according to the invention inlet/outlet openings are arranged in the wall of the pipe for allowing material flowing in/out of the cavities.

It is noted that in EP1039201 a flexible pipe having cavities surrounding the inner conduit is described. This known pipe is described to be made from thermoplastic materials using an extrusion process. The known pipe is not suitable for transporting fluids, since it cannot withstand the corresponding (high) pressures. The known pipe is developed but for use in housing and laying of cables only.

Figure 2A:
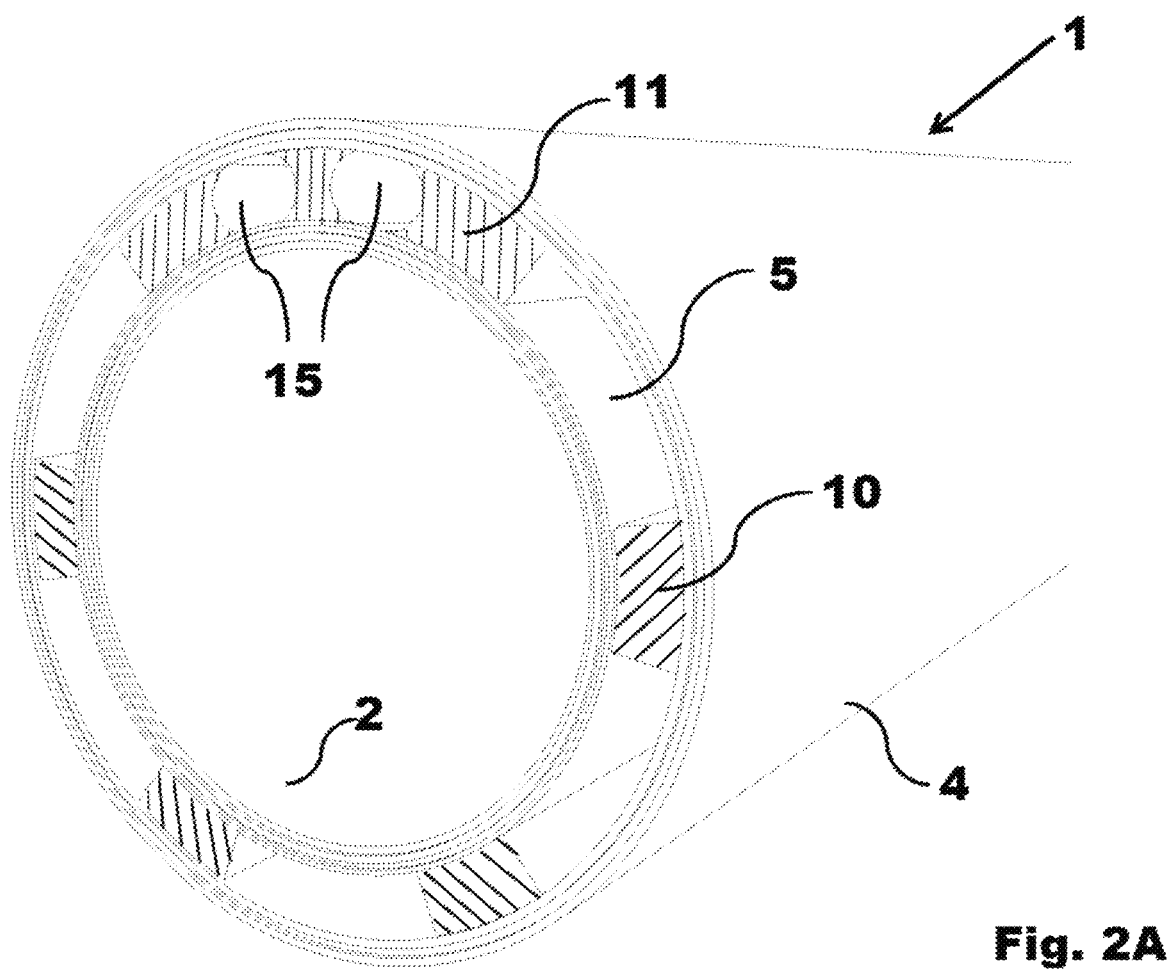
Figure 2B:
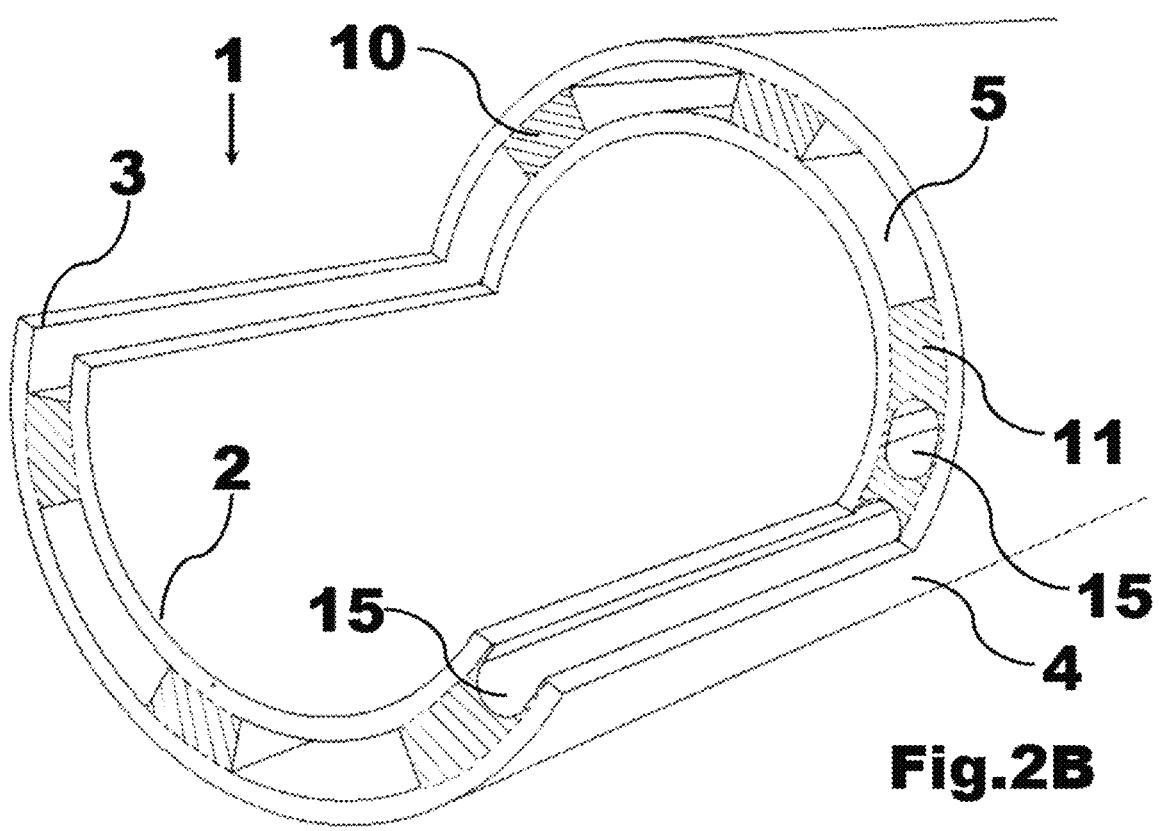
Figure 3A:
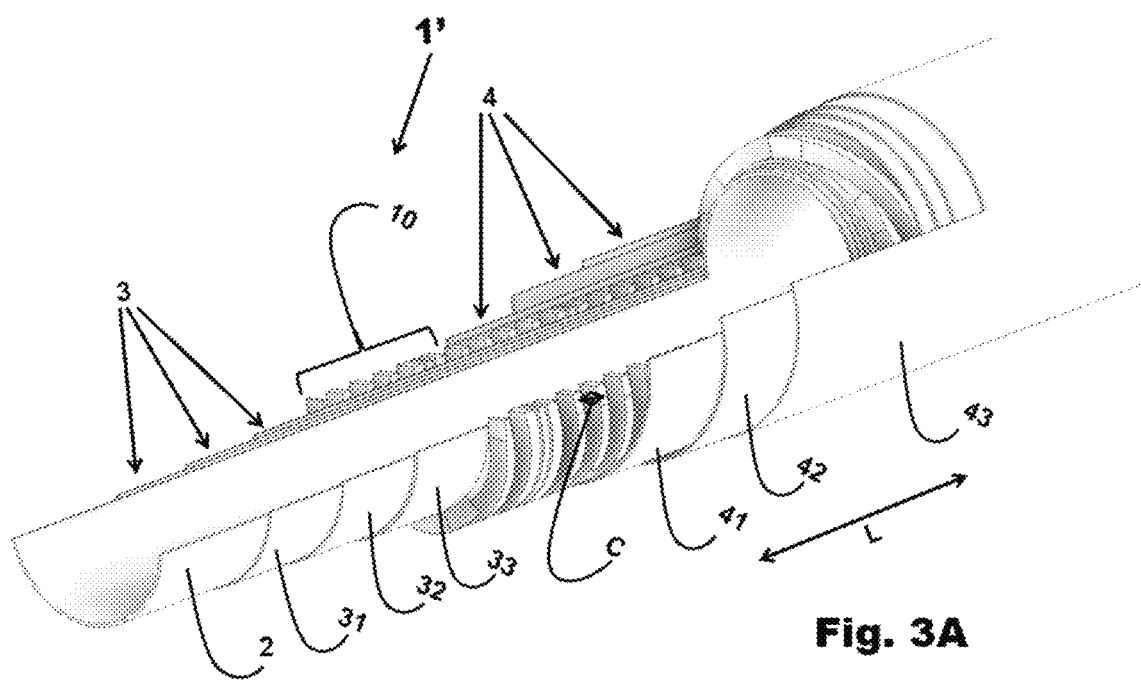
Figure 3B:
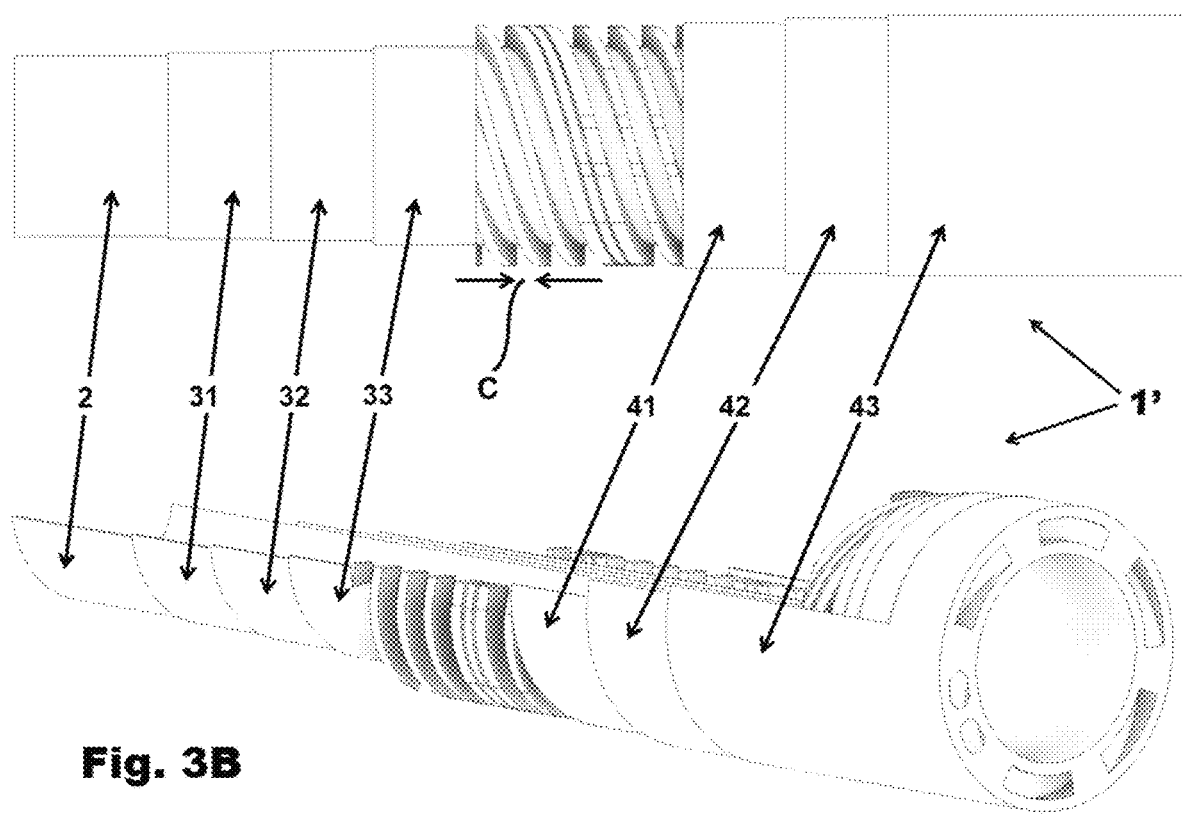
Figure 4A:
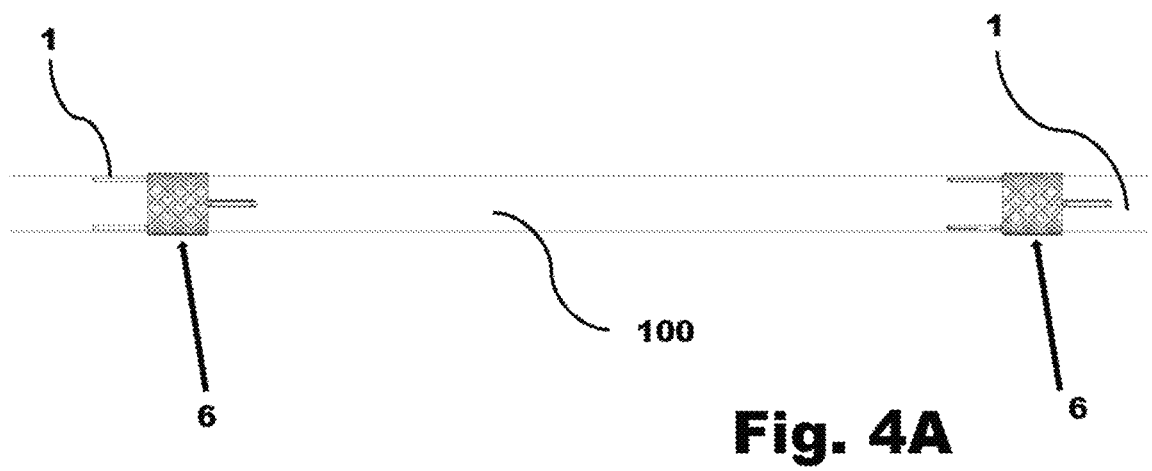
Figure 4B:
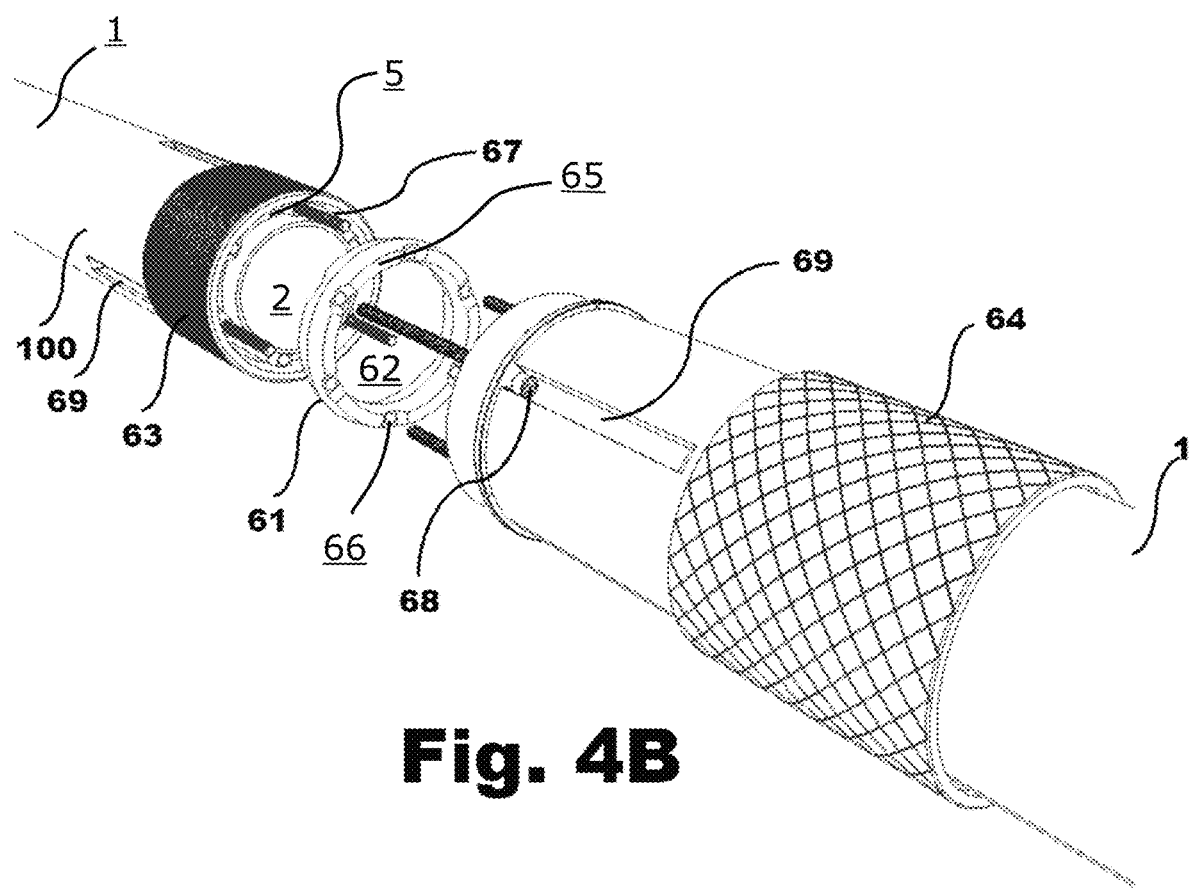

The invention will now further be described referring to the appending figures, in which:

FIG. 1 schematically illustrates production of a first embodiment of a pipe according to the invention;

FIG. 2A schematically shows part of the pipe of FIG. 1 in cross section;

FIG. 2B schematically shows the pipe of FIG. 2A with partly cut away section; and FIG. 3A schematically shows a second embodiment of a pipe according to the invention with cut away sections;

FIG. 3B schematically shows the second embodiment of FIG. 3A in cross section with cut away sections;

FIG. 4A schematically shows a system of pipes coupled by coupling elements according to the invention;

FIG. 4B schematically shows the system of FIG. 4A in decoupled state; and

Figure 5A:
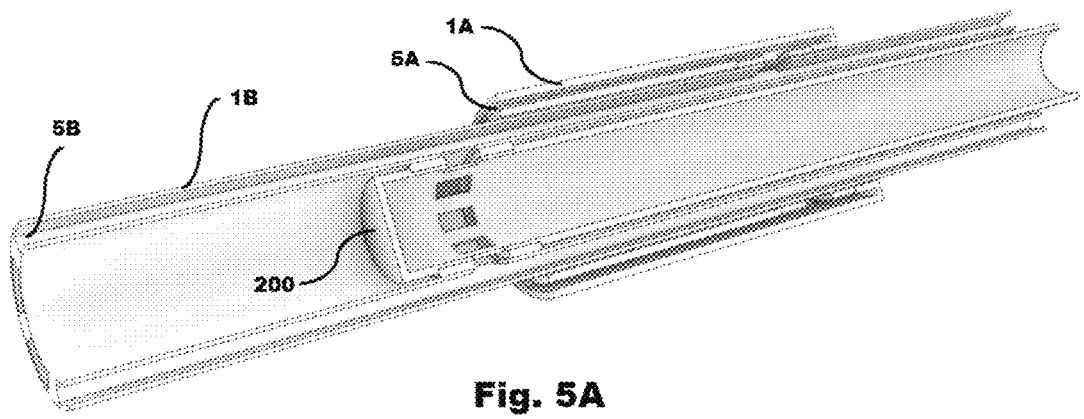
Figure 5B:
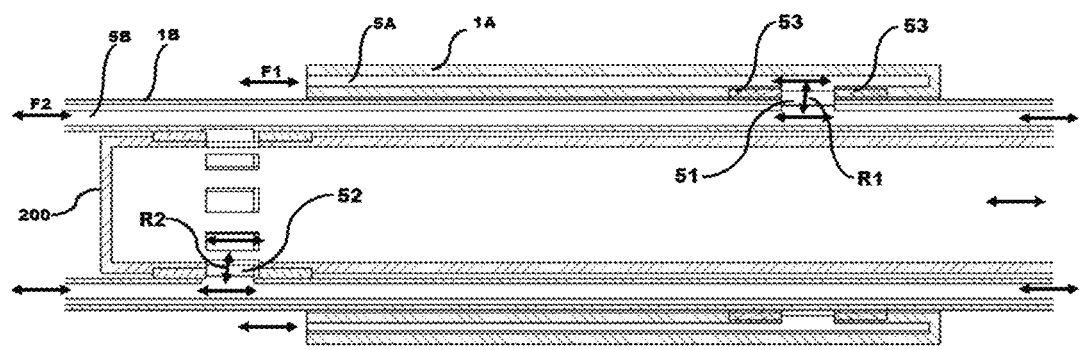
Figure 5C:
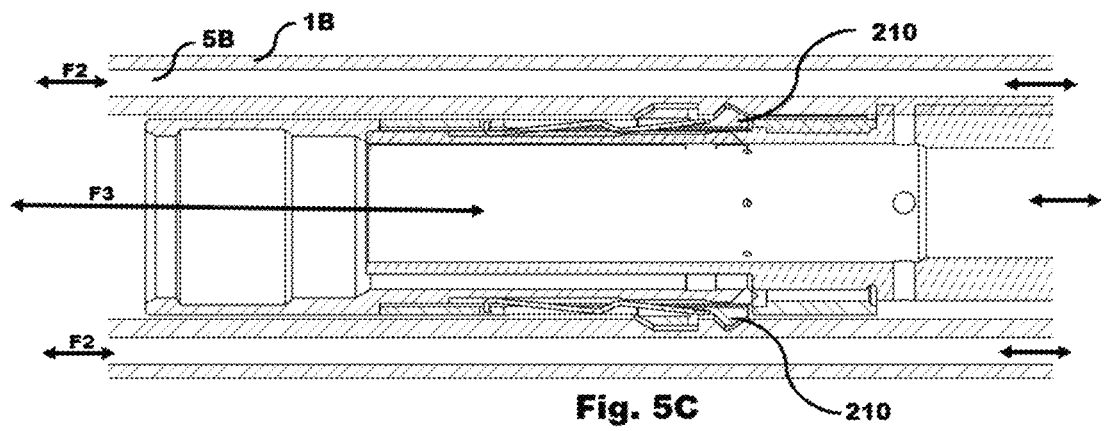

FIG. 4C schematically shows part of the coupling element of FIG. 4B in more detail;

FIG. 4D shows part the part of FIG. 4C in cross section;

FIG. 5A schematically shows a pair of pipes according to the invention that are coaxially arranged and accommodate equipment;

FIG. 5B shows the pair of coaxially arranged pipes of FIG. 5A in cross section; and FIG. 5C shows one pipe of the pair of coaxially arranged pipes of FIG. 5A partly in cross section with equipment.

FIG. 1 schematically illustrates pipe 1 in a first embodiment during production according to the method according to the invention. FIG. 2A schematically shows a cross section of part of pipe 1. FIG. 2B schematically shows the pipe 1 of FIG. 2A with partly cut away section.

Pipe 1 is a first embodiment suitable for use in the production of hydrocarbons. All materials used therein need to be able to withstand the high pressure and high temperature that may occur during the production of hydrocarbons. Preferably use is made of thermoplastic materials. One example of a specifically suitable thermoplastic material is known in the relevant field as (PEEK) polymer, a polyaryletherketone material produced by VICTREX.

In a first step of the method according to the invention a tubular body 2 is selected for forming an inner conduit of the pipe 1. Tube 2 is preferably produced using known extrusion methods.

Depending on the intended use of the pipe and the characteristics of the tube 2 the first step optionally further comprises applying an inner cover 3 over the inner conduit 2. Preferably one or more layers 31, 32, 33 are wound around the inner conduit 2 to form the inner cover 3.

The layers 31-33 may include thermoplastic material, reinforcing material and/or protective material. Suitable reinforcing material comprises aramid fibres. Suitable protective material provides protection against abrasion.

According to a second step of the method according to the invention a number of spacer elements 10 are attached at a mutual distance to the outer side of the inner conduit 2. Each spacer element 10 has a general longitudinal shape. The spacer elements 10 can be laid in suitable patterns. One preferred pattern involves attaching the spacer elements 10 such that they extend substantially in longitudinal direction over the inner conduit 2. This preferred embodiment is shown in FIG. 1. In the preferred embodiment shown the longitudinal direction of the pipe 1 is denoted with the arrow and letter L. The mutual distance between adjacent spacer elements 10 is denoted with the arrow and letter C. As the pattern of spacer elements 10 extends in longitudinal direction L, the mutual distance C between the spacer elements 10 is a circumferential distance.

FIGS. 3A and 3B schematically show a pipe 1' according to the invention with partly cut away section. Pipe 1' is an alternative second embodiment, wherein the spacer elements 10 are attached such that they extend substantially in helical direction around the inner conduit 2.

The spacer elements are preferably of a non-corrosive metal or a thermoplastic material. The spacer elements are preferably arranged substantially equidistant. The spacer elements may be cut out of a further tube. Said further tube is selected such that its inner radius substantially corresponds to the outer radius of the tube for forming the inner conduit 2. The further tube or the individual spacer elements can also be produced by known methods of extrusion.

The spacer elements can either be massive or hollow. Hollow spacer elements 11 include cavities or channels allowing flow of material through the spacer elements.

The spacer elements 10 are first placed in the desired pattern and then adhered to the inner conduit 2. Suitable adhesive materials may be used. Alternatively when thermoplastics are used the pipe may be heated at least in part up to the softening temperature of the thermoplastic materials during a predetermined time period for adhering the spacer elements 10 to the inner conduit 2. Suitable heating means may include a laser to temporary heat the contacting surfaces of the spacer elements 10 with the inner conduit 2.

According to a further step of the method according to the invention an outer cover 4 is applied around the inner conduit 2 and the spacer elements 10. As a result thereof cavities or channels 5 are enclosed by the inner conduit 2, the spacer elements 10 and the outer cover 4. Preferably one or more layers 41, 42, 43 are wound around the inner conduit 2 and the spacer elements 10 to form outer cover 4.

The layers 41-43 may include thermoplastic material, reinforcing material and/or protective material. Suitable reinforcing material comprises aramid fibres. Suitable protective material provides protection against abrasion.

A final step of the method according to the invention comprises adhering the spacer elements 10 to the outer cover 4 as well as adhering the layers to form the outer cover. Suitable adhesive materials may be used. When thermoplastics are used adhering may be accomplished by heating the pipe at least in part up to the softening temperature of the thermoplastic materials during a predetermined time period. Suitable heating means may include a laser to temporary heat the contacting surfaces of the spacer elements 10 with the outer cover 4 and the layers therein.

Preferably the cavities or channels 5 are fluid tight and suitable for use as fluid passageways in the production of hydrocarbons.

Inlet/outlet openings can be arranged in the wall of the pipe to allow fluid to flow between the inner conduit 2 and the cavities 5 and/or between the cavities 5 and the surroundings of the pipe 1. This is illustrated in FIGS. 5A, 5B and 5C.

FIG. 4A schematically shows a system of pipes 1 coupled by coupling elements 6 according to the invention. The coupling elements 6 are arranged to provide for continuous passageways through the coupled pipes. In the coupled state the inner conduits 2 of adjacent pipes form a continuous inner channel. In the coupled state the cavities 5 or 15 of adjacent pipes form continuous outer channels. In FIG. 4A a longitudinal housing 100 is coupled at both outer ends to a flexible pipe 1 according to the invention. The housing is an example of a tubing arranged to receive plug-in devices of the WROP-system as described in WO2014/011043.

FIG. 4B schematically shows the system of FIG. 4A in decoupled state. Coupling element 6 is shown in more detail in FIG. 4C. Coupling element 6 comprises a male part 63 and a female part 64 for receiving the male part 63 and a joint element 61 for placement between the flexible pipes 1 or 100. The joint element comprises an inner opening 62 and surrounding outer openings 65 and further comprises through holes 66 for longitudinal fasteners 67, such as bolts. In the coupled state of the coupling element 6 the joint element 61 is enclosed therein.

The dimensions of the inner opening 62 of the coupling element 6 correspond to the dimensions of the inner conduit 2 of pipe 1. The dimensions of the outer openings 65 of the coupling element 6 correspond to the dimensions of the cavities 5 or 15 of pipe 1. In FIGS. 4C and 4D the dashed arrows indicate passageways for materials and the dashed lines indicate the through holes for the fasteners. The joint element 61 is generally ring shaped. The outer openings 65 and the holes 66 are arranged alternately over the joint element 61. The holes 66 are recessed with respect to the outer openings 65. The shape of the outer openings 65 corresponds to the shape of the cavities 5 of the pipe 1. The mating shape of the joint element 61 and the outer ends of the flexible pipes 1 allow for a fluid tight seal.

At the outer ends of the flexible pipes 1 slots 69 are arranged for receiving the fasteners 67. In the preferred embodiment shown two pairs of three bolts each face each other. Preferably the female part 64 has inner thread and the male part 63 has outer thread. Coupling element 6 can be coupled and decoupled manually.

The coupling element according to the invention can further be connected to the following non-limited enumeration of examples:
  a) Pipe Equipment Elements used in Hydrocarbon production environments, such as Sliding Side doors, to interconnect (open or closing) the inner pipe to the external environments
  b) Crossovers—to connect the pipe to smaller or larger diameter pipes or elements;
  c) Packer elements to seal-off the external or inner spaces in and around the pipe,
  d) Filter elements (wired or slotted) for in and out-flowing fluids or gasses,
  e) Side Pocket elements for use with measuring equipment and valves
  f) Anchor elements to fixate the pipes into a larger diameter pipe or external conduit.

FIGS. 5A through 5C illustrate a pair of pipes 1A, 1B according to the invention that are coaxially arranged and accommodate equipment 200. One example of equipment is a plug-in device of the WROP-system as described in WO2014/011043.

Fluid flow in the cavities 5A of outer pipe 1A is indicated with arrow F1. A substantially parallel fluid flow in the cavities 5B of inner pipe 1B is indicated with arrow F2. A substantially parallel fluid flow through the equipment 200 is indicated with arrow F3. Inlet/outlet openings 51 are arranged in adjacent walls of the pipes 1A, 1B to allow fluid flow R1 between the cavities 5A and 5B. Inlet/outlet openings 52 are arranged in the wall of the pipe 1B to allow fluid flow R2 between the cavities 5B and openings in the equipment 200. The inlet/outlet openings are sealed, as illustrated by seals 53 adjacent to inlet/outlet openings 51. Suitable fixation means 210 are present to fixate the equipment 200 in the pipe 1B.

The present invention is elucidated by means of preferred embodiments for use in the production of hydrocarbons. Nevertheless it is stretched that the pipe is generally suitable for transporting material flows, including fluid, gases, or particles, and is generally suitable for transporting all types of material flows even in highly demanding circumstances.

The invention is not therefore limited to the described and shown preferred embodiments, but extends to all combinations thereof and moreover to any embodiment falling within the scope of protection as defined in the claims and as seen in the light of the foregoing description and accompanying drawings.

The invention claimed is:

1. System of flexible pipes (1) and coupling elements (6) for coupling the flexible pipes, wherein the flexible pipes each comprise an inner conduit (2) and multiple cavities (5) running substantially parallel over the outer surface of the inner conduit and wherein the coupling element comprises an inner opening (62) and multiple outer openings (65) surrounding the inner opening, such that, in the coupled state, the inner conduits (2) of adjacent flexible pipes are connected by means of the inner opening (62) of the intermediate coupling element (6) and the cavities (5) of adjacent flexible pipes (1) are connected by means of the outer openings (65) of the intermediate coupling element,
  characterized in that each coupling element (6) comprises a male part (63) and a female part (64) for receiving the male part and a joint element (61) for placement between two flexible pipes, wherein the joint element comprises the inner opening (62) and the outer openings (65), wherein the dimensions of the inner opening (62) correspond to the dimensions of the inner conduit (2) and the dimensions of the outer openings (65) correspond to the dimensions of the cavities (5) for forming straight passageways between adjacent flexible pipes and wherein the joint element (61) further comprises through holes (66) for longitudinal fasteners (67), wherein the flexible pipes at the outer ends are arranged for receiving the fasteners.

2. System according to claim 1, wherein in the coupled state of the coupling element (6) the joint element (61) is enclosed in the coupling element (6).

3. System according to claim 1, wherein the female part (64) has inner thread and the male part (63) has outer thread.

4. System according to claim 1, wherein each pipe (1) comprises:
  a) An inner conduit (2);
  b) A number of spacer elements (10) having a general longitudinal shape fixated at a mutual distance to the outer side of the inner conduit;
  c) An outer cover (4) formed by one or more layers (41, 42, 43) of thermoplastic material fixated around the inner conduit (2) and the spacer elements (10), characterised in that longitudinal cavities (5) suitable for use as passageways for objects are formed between the inner conduit (2), the spacer elements (10) and the outer cover (4).

5. System according to claim 4, wherein the inner conduit (2) comprises an inner cover (3) formed by one or more layers (31, 32, 33) of thermoplastic material fixated around the inner conduit.

6. System according claim 1, wherein inlet/outlet openings (51, 52) are arranged in the wall of the pipe for allowing material flowing in/out of the cavities (5).

* * * * *